UNITED STATES PATENT OFFICE.

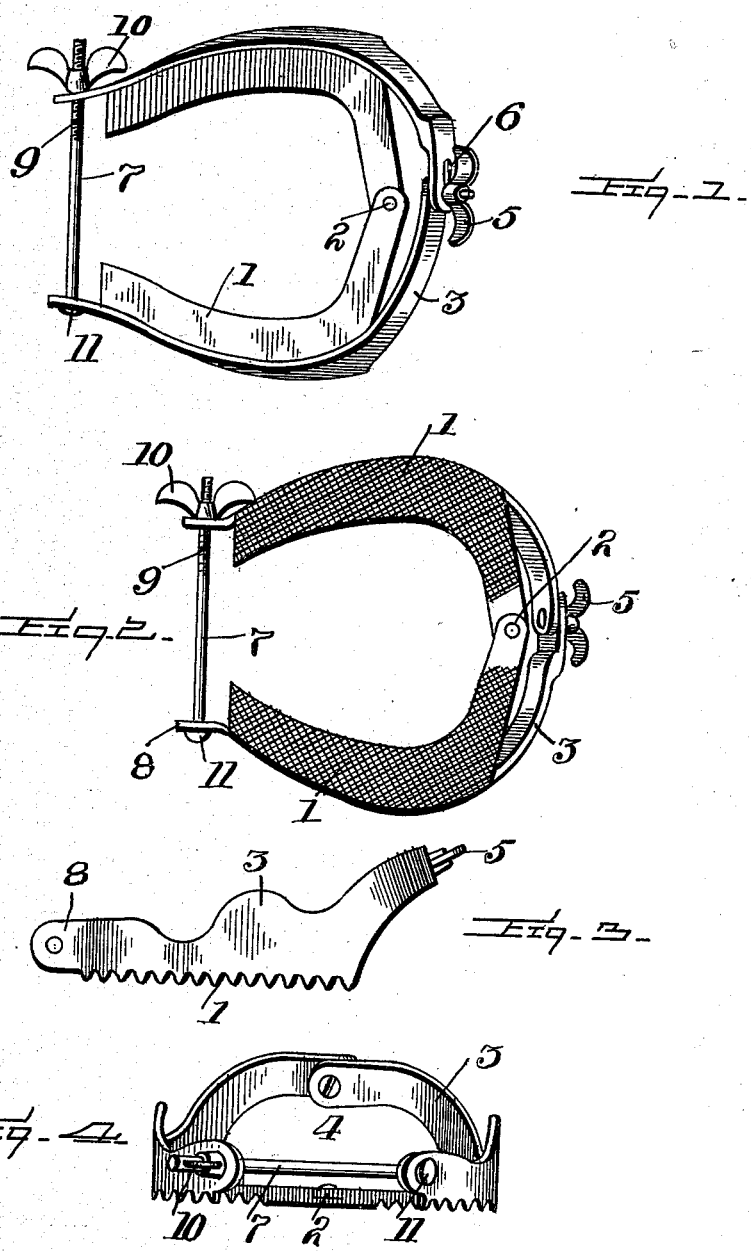

JAMES B. McCLINTOCK, OF PITTSBURG, PENNSYLVANIA.

OVERSHOE FOR HORSES.

SPECIFICATION forming part of Letters Patent No. 716,266, dated December 16, 1902.

Application filed February 21, 1902. Serial No. 95,111. (No model.)

*To all whom it may concern:*

Be it known that I, JAMES B. MCCLINTOCK, a citizen of the United States of America, residing at Pittsburg, in the county of Allegheny and State of Pennsylvania, have invented certain new and useful Improvements in Overshoes for Horses, of which the following is a specification, reference being had therein to the accompanying drawings.
This invention relates to certain new and useful improvements in overshoes for horses, and relates more particularly to an emergency shoe to be placed on the horse's hoof in case it is desirable to drive the horse over slippery surfaces.

The present invention contemplates to provide a device of this character that will admit of the adjustment both at the toe and heel of the overshoe and provide novel means whereby the overshoe may be securely clamped to the hoof.

Another object of the invention is to provide a device that may be easily applied and readily removed from the horse's hoof when desired.

The present invention further aims to provide a device that will be extremely simple in construction, strong, durable, comparatively inexpensive to manufacture; furthermore, one that will be extremely light upon the horse's hoof.

A still further object of my invention is to provide a roughened surface upon the under face of the overshoe that will act as an ice-creeper and obviate the necessity of the sharpening of the calks and toe-plates of the shoe.

With the above and other objects in view the invention consists in the novel combination and arrangement of parts to be hereinafter more fully described, and specifically pointed out in the claims.

In describing the invention in detail reference is had to the accompanying drawings, forming a part of this specification, and wherein like numerals of reference indicate like parts throughout the several views, in which—

Figure 1 is a top plan view of my improved device. Fig. 2 is an under plan view thereof.
Fig. 3 is a side elevation of the shoe. Fig. 4 is a rear elevation thereof.

In the drawings the reference-numerals 1 1 represent corrugated plates, which are hinged together at 2 at the toe of the shoe. Formed integral with these corrugated plates are sides 3 3, forming an opening 4 in the front of the toe, said sides extending forwardly to conform to the front of the hoof and are secured together by means of a thumb-nut 5. In the end of the forwardly-extending portion of one of the sides is formed a slot 6 in order to admit the lateral adjustment of the shoe and permit the same to be securely clamped to the horse's hoof, the clamping means at the heel of the hoof consisting of a shaft 7, passing through the rearwardly-extending lugs 8, formed integral with the sides 3, this shaft 7 having formed thereon screw-threads 9, upon which is secured the thumb-nut 10, and the other end of the shaft 7 carries a head 11.

It will be seen that the overshoe constructed in accordance with the herein-described invention may be easily applied to the horse's hoof and readily removed therefrom when desired; furthermore, that the shoe will readily conform to any width of hoof.

The many other advantages obtained by the use of my improved device will be readily apparent from the foregoing description, taken in connection with the accompanying drawings.

It will be noted that various changes may be made in the details of construction without departing from the general spirit of my invention.

Having fully described my invention, what I claim as new, and desire to secure by Letters Patent, is—

1. An overshoe for horses comprising two hinged plates having corrugated under faces, upwardly-extending sides formed integral with the plates extending forwardly and forming a space for the reception of the horse's toe with means for securing the front ends of the sides together, and means extending across the heel of the horse's hoof and engaging the rear ends of the sides for securing the same, substantially as described.

2. An overshoe for horses comprising two hinged plates corrugated on their under faces, sides formed integral with the plates and having their front ends bent upwardly forming a space for the reception of the horse's toe, with means for securing said front ends together, the rear ends of the sides extending in the same plane as the plates and beyond the ends of the latter, and a connection between said rear ends of the sides extending across the heel of the horse's hoof, substantially as described.

3. In an overshoe for horses, the combination of plates formed in two sections pivoted together, a roughened surface formed on the under face of said plates, sides and forwardly-extending portions formed integral with said plates, a thumb-nut securing the forward portions of the sections together, and a screw-threaded shaft and thumb-nut securing the rearward portions of the sections together, substantially as described.

In testimony whereof I affix my signature in the presence of two witnesses.

JAMES B. McCLINTOCK.

Witnesses:
JOHN NOLAND,
E. E. POTTER.